United States Patent Office 3,008,740
Patented Nov. 14, 1961

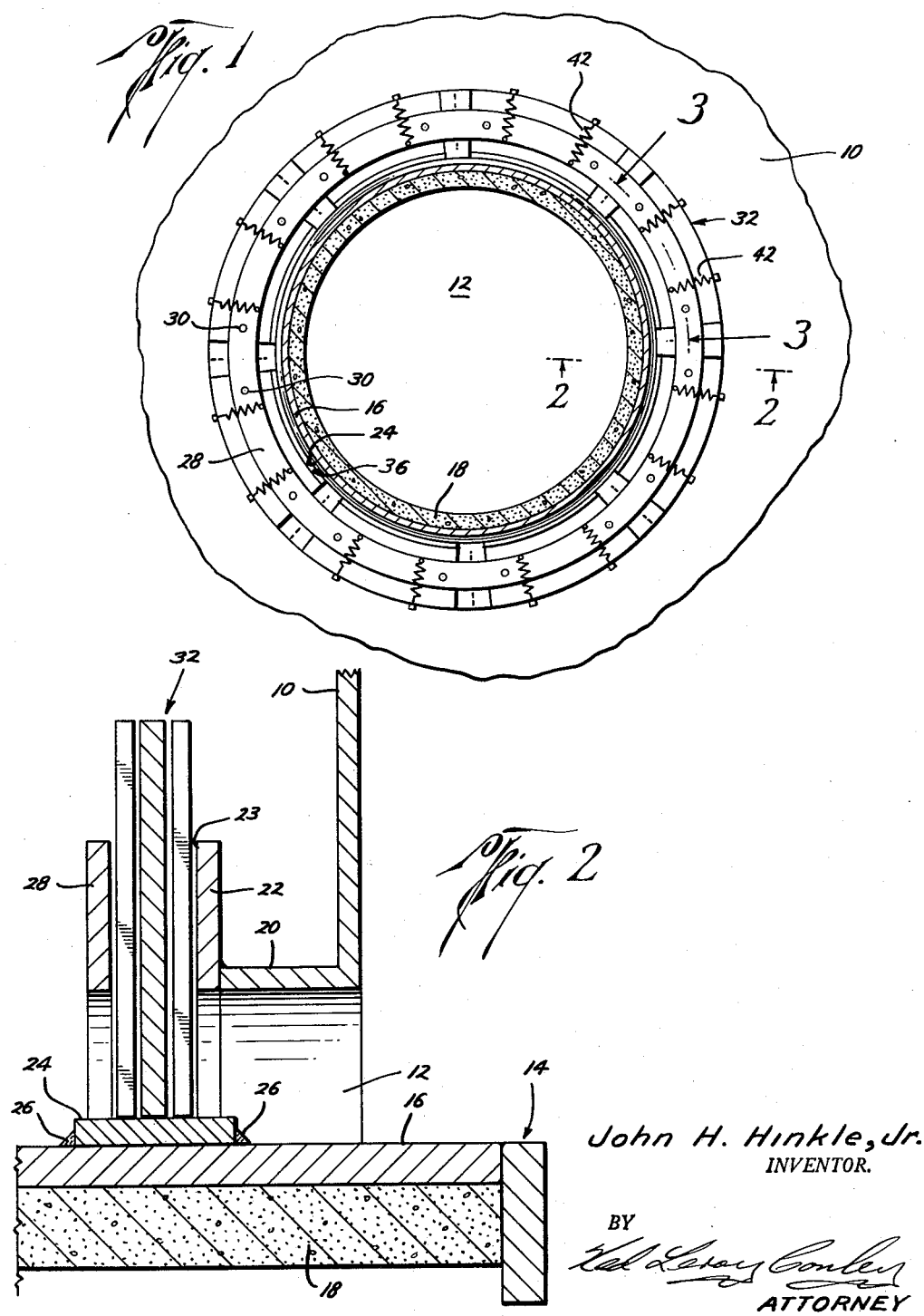

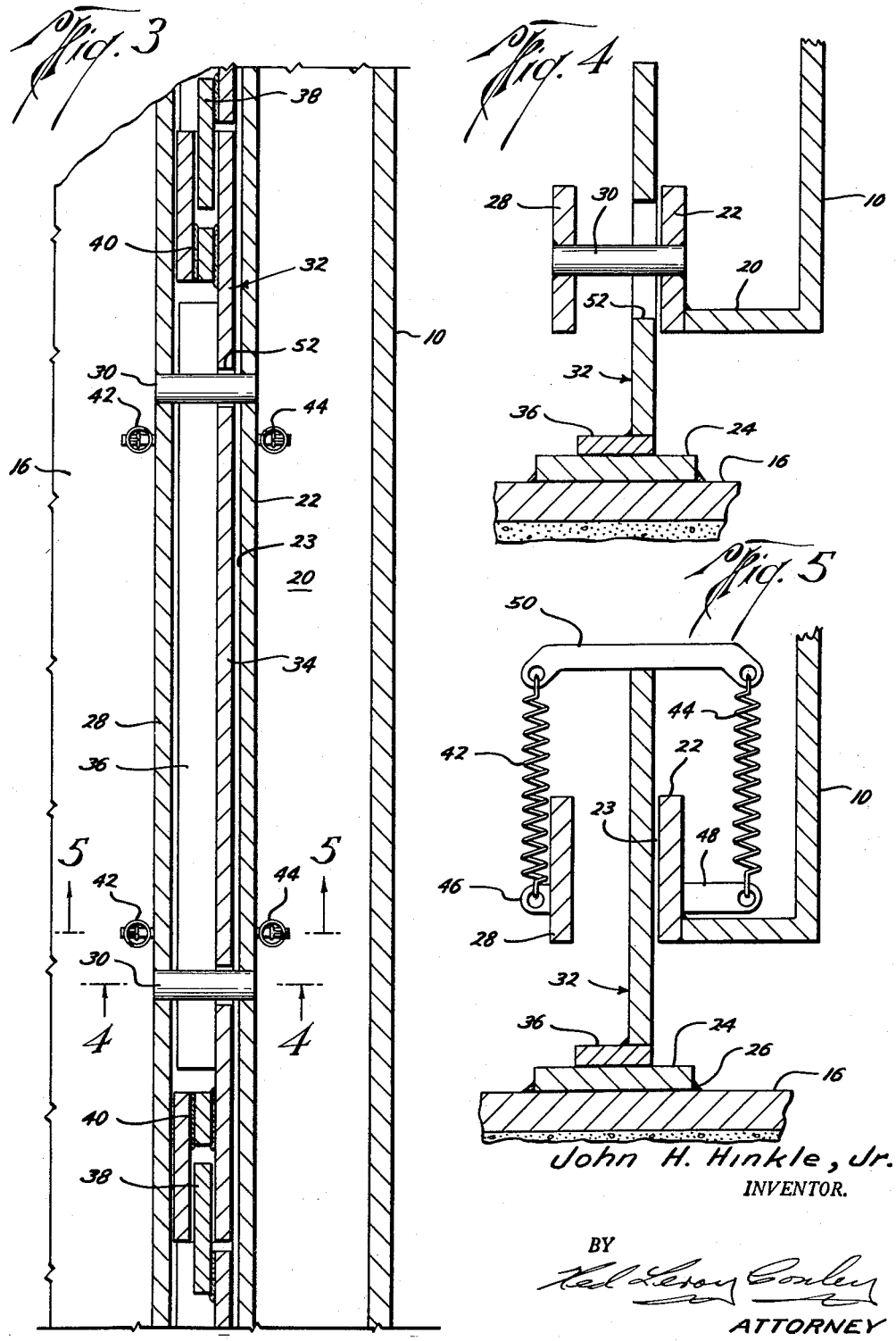

3,008,740
KILN SEAL
John H. Hinkle, Jr., Houston, Tex., assignor, by mesne assignments, to Hooker Chemical Corporation, New York, N.Y., a corporation of New York
Filed June 10, 1959, Ser. No. 819,336
2 Claims. (Cl. 286—11.16)

This invention relates to an improved sealing device, and more particularly to an improved seal for horizontal rotary kilns.

The use of rotary kilns is widespread throughout industry, and is particularly well known in the cement and fertilizer industries, among others. A major problem in the use of such kilns is the provision of an efficient sealing device at the ends of the kiln. It will readily be seen that efficient sealing is very desirable, since otherwise obnoxious and sometimes corrosive and poisonous gases will escape into the atmosphere and cause injury to workmen, equipment, and the surrounding community. For example, in the preparation of phosphate rock for fertilizer manufacture, hydrogen fluoride is given off during the kiln burning step. The loss of this gas to the atmosphere must be kept to a minimum.

Rotary kilns generally operate under a vacuum, so that in the absence of an effective seal an excess of outside air will be drawn into the kiln exhaust system, thereby diluting the off gas to undesirable concentrations. In addition, such excess air causes fluctuations in the draft in the kiln tube, thus creating a burning zone control problem. Entry of excess air also loads the kiln exhaust system, thereby reducing the kiln capacity and decreasing its efficiency.

Various sealing means have heretofore been proposed and used for sealing the ends of the kiln where it communicates with other chambers or equipment, however none of these will properly seal under the difficult conditions presented by most kilns. These kilns generally are of large diameter running from a few feet up to sixteen feet or more, and of considerable length, up to several hundred feet. Due to their size, the kilns are usually out-of-round and crooked, so that the ends of the kiln seldom rotate about the axis of the kiln, but instead the ends wobble up to several inches. Such inaccuracies, plus the extremely high temperatures generally used in horizontal rotary kilns, result in a very difficult sealing problem.

Applicant has now devised a new sealing device which is particularly suitable for the sealing of rotary kilns, although it is also suited for sealing of other rotary devices where it is not necessary to have a complete seal.

For a better understanding of applicant's invention, reference is now made to the drawing, wherein FIGURE 1 is a view of a segment of the wall of a receiving chamber with which a rotary kiln is in sealing engagement, the kiln being shown in vertical section;

FIGURE 2 is a cross-sectional view of the sealing device of this invention, taken at line 2—2 on FIGURE 1 and on FIGURE 3;

FIGURE 3 is a circumferential sectional view of a portion of the sealing device of this invention, taken at line 3—3 of FIGURE 1;

FIGURE 4 is a cross-sectional view of the sealing device of this invention taken at line 4—4 of FIGURE 3; and FIGURE 5 is a cross-sectional view of the sealing device of this invention taken at line 5—5 of FIGURE 3.

In FIGURE 1 is shown a chamber wall 10 having an aperture 12 (see FIG. 2) into which the end of a rotary kiln 14 having a wall 16 is received. Kiln 14 is lined with fire brick 18 or other refractory material known in the art. A circumferential wall 20 surrounds aperture 12 in the chamber wall 10 and extends outwardly from the chamber a short distance. Attached to the end of wall 20 and extending radially outwardly therefrom is a circumferentially extending sealing flange 22 having a seal face 23.

Extending circumferentially around kiln 14 and near the end thereof is a wear band 24, attached to the wall 16 of kiln 14 as by welds 26.

Referring now particularly to FIGURES 3, 4, and 5, an annular ring 28 is supported around kiln 14 and spaced away from sealing flange 22 by means of pins 30. Intermediate sealing flange 22 and ring 28 is an annular segmented sealing ring 32 comprising a series of arcuate segments 34, each of which has attached to its inner radial edge a curved wear flange 36. Wear flanges 36 do not extend all the way to the ends of their respective arcuate segments 34, as shown in FIGURE 3. Instead, means are provided on the ends of the segments for tongue and groove engagement of the ends of adjacent arcuate segments 34. This means comprises a tongue member 38 on one segment and a groove member 40 on the adjacent segment. Thus segments 34 are enabled to slide with respect to each other when kiln 14 moves radially. Each segment 34 of sealing ring 32 is held in resilient engagement with wear band 24 by means of springs 42 and 44. Springs 42 are attached to annular ring 28 by means of eyes 46, and each spring 44 is attached to sealing flange 22 by means of eyes 48. The other ends of the springs are attached to spring arms 50 which traverse the radially outer edge of segments 34.

As may be seen in FIGURES 3 and 4, pins 30, which support and position ring 28, extend through enlarged apertures 52 in segments 34. Kiln 14, and therefore segments 34, may thus move radially with respect to the aperture 12 in the chamber wall 10, and still maintain engagement of wear flange 36 with wear band 24. This engagement is maintained by the tension of springs 42 and 44. Thus when the rotary kiln 14 rotates, eccentric movement of the end of the kiln which communicates with the chamber does not cause the seal between wear flanges 36 and wear band 24 to be disrupted. The segments 34 may slide with respect to each other so that they form a continuous annular sealing ring even when the end of the kiln is moving eccentrically.

It is apparent that the sealing device of this invention does not give a complete seal, since some leakage may be expected between each tongue member 38 and groove membr 40, between sealing flange 22 and sealing ring 32, and through apertures 52. However, due to the relatively close clearance maintained, such leakage is very small, and is not sufficient to be objectionable in most cases.

Wear band 24 and wear flanges 36 are preferably made of a hardened steel, or are faced, on their rubbing faces, with a hard material, such as Stellite, so as to provide long life. The use of such hardened materials, however, is not necessary, since wear band 24 becomes work-hardened during use.

Although a specific embodiment of the invention has been shown and described herein, the invention is not limited to this embodiment, but only as set forth by the appended claims.

I claim:

1. A sealing device for sealing between a rotatable cylindrical member and a communicating chamber comprising an annular segmented sealing ring extending circumferentially around said cylindrical member, said segmented sealing ring comprising a plurality of arcuate segments with cooperating tongue and groove elements on the ends of adjacent arcuate segments, a wear band circumscribing said cylindrical member between the cylindrical member and the segmented sealing ring, an annular, substantially flat sealing flange attached to the chamber and extending circumferentially around the cylindrical member and having an inner radius of curvature greater than the radius of curvature of said cylindrical member, a seal face on said sealing flange adjacent said segmented sealing ring so as to form a close clearance therebetween, an annular ring surrounding and spaced away from the cylindrical member on the opposite side of the segmented sealing ring from the sealing flange, at a distance from said sealing flange only slightly greater than the thickness of the aforesaid tongue and groove elements, a plurality of tension springs each having one end attached to said annular ring substantially equidistantly apart, a plurality of tension springs each having one end attached to said sealing flange substantially equidistantly apart, and a plurality of spring arms extending transversely of and outwardly of said segmented sealing ring, one spring on each side of said segmented sealing ring being attached to each of said spring arms.

2. A sealing device for sealing between a rotary kiln and a communicating chamber comprising an annular segmented sealing ring extending circumferentially around the kiln, said sealing ring comprising a plurality of arcuate segments having an inner radius of curvature substantially the same as the radius of curvature of the kiln and cooperating tongue and groove elements on their adjacent ends; an annular, substantially flat sealing flange attached to the chamber and extending circumferentially around the kiln, having an inner radius of curvature greater than the radius of curvature of the kiln and having seal face adjacent said segmented sealing ring so as to form a close clearance therebetween; an annular ring surrounding the kiln on the opposite side of the segmented sealing ring from the sealing flange; a plurality of tension springs attached to said annular ring; a plurality of tension springs attached to said sealing flange; and a spring arm extending transversely of and outwardly of each of said arcuate segments, to which the opposite ends of said springs are attached, whereby each of said arcuate segments is urged radially inwardly toward said kiln.

References Cited in the file of this patent

UNITED STATES PATENTS

| | | |
|---|---|---|
| 2,048,581 | Weiher | July 21, 1936 |
| 2,522,993 | Coffey | Sept. 19, 1950 |
| 2,836,441 | Doble | May 27, 1958 |